(12) United States Patent (10) Patent No.: US 11,750,041 B2
Sieber et al. (45) Date of Patent: Sep. 5, 2023

(54) WIRE-WOUND STRUCTURES FOR ELECTROMAGNETIC SENSING OF OBJECTS

(71) Applicant: WiTricity Corporation, Watertown, MA (US)

(72) Inventors: Lukas Frank Sieber, Olten (CH); Markus Bittner, Sarmenstorf (CH); Hans Peter Widmer, Wohlenschwil (CH); Marcel Fischer, Boniswil (CH)

(73) Assignee: WiTricity Corporation, Watertown, MA (US)

( * ) Notice: Subject to any disclaimer, the term of this patent is extended or adjusted under 35 U.S.C. 154(b) by 0 days.

(21) Appl. No.: 17/557,675

(22) Filed: Dec. 21, 2021

(65) Prior Publication Data

US 2022/0239160 A1 Jul. 28, 2022

Related U.S. Application Data

(60) Provisional application No. 63/141,730, filed on Jan. 26, 2021.

(51) Int. Cl.
*H02J 50/60* (2016.01)
*H02J 50/12* (2016.01)

(52) U.S. Cl.
CPC ............. *H02J 50/60* (2016.02); *H02J 50/12* (2016.02)

(58) Field of Classification Search
CPC ........... H02J 50/60; H02J 50/12; Y02T 10/70; Y02T 10/7072; Y02T 90/12; Y02T 90/14
See application file for complete search history.

(56) References Cited

U.S. PATENT DOCUMENTS 5,263,639 A * 11/1993 Lee .................. H01F 41/076
29/605
9,726,518 B2 8/2017 Widmer et al.
(Continued)

FOREIGN PATENT DOCUMENTS

EP 3124314 2/2017
WO WO-2015064356 A1 * 5/2015 ............. H01F 17/04
WO 2021081382 4/2021

OTHER PUBLICATIONS

Baird, "Is it possible to create magnetic waves?" pp. 1-4 2016 (Year: 2016).*

(Continued)

*Primary Examiner* — Daniel Kessie
*Assistant Examiner* — Brian K Baxter
(74) *Attorney, Agent, or Firm* — Colby Nipper PLLC

(57) ABSTRACT

This disclosure provides an apparatus for detecting a presence of an object in a predetermined area of an inductive wireless power transfer system. The apparatus comprises a first wire-wound structure having an electrical characteristic configured for electromagnetic sensing of the object. The first wire-wound structure is formed, carried, and held in place by a coil-former substantially from a non-conductive material. The coil-former also forms, carries, and holds in place a second wire-wound structure configured for transferring power inductively. The apparatus further comprises a detection circuit coupled to the first wire-wound structure and configured to measure the electrical characteristic of the first wire-wound structure and to detect the presence of the object in response to a change in the electrical characteristic.

19 Claims, 10 Drawing Sheets

(56) References Cited

U.S. PATENT DOCUMENTS

| | | | |
|---|---|---|---|
| 9,921,045 B2 | 3/2018 | Sieber et al. | |
| 9,952,266 B2 | 4/2018 | Katz et al. | |
| 10,122,192 B2 | 11/2018 | Chopra et al. | |
| 10,124,687 B2 | 11/2018 | Percebon et al. | |
| 10,293,696 B2 | 5/2019 | Ludwig et al. | |
| 10,295,693 B2 | 5/2019 | Widmer | |
| 10,298,049 B2 | 5/2019 | Widmer et al. | |
| 10,302,795 B2 | 5/2019 | Widmer et al. | |
| 10,340,752 B2 | 7/2019 | Widmer et al. | |
| 10,411,524 B2 | 9/2019 | Widmer et al. | |
| 10,495,773 B2 | 12/2019 | Widmer et al. | |
| 10,566,839 B2 | 2/2020 | Widmer et al. | |
| 10,627,257 B2 | 4/2020 | Widmer | |
| 2003/0025679 A1 | 2/2003 | Taylor | |
| 2004/0075442 A1* | 4/2004 | Iannello | G01D 5/2417 324/632 |
| 2006/0250144 A1* | 11/2006 | Braun | G01R 27/2605 324/678 |
| 2013/0003034 A1* | 1/2013 | Verburg | G01D 5/24 324/76.38 |
| 2013/0181701 A1* | 7/2013 | Galbraith | G01N 27/9006 324/232 |
| 2013/0257168 A1 | 10/2013 | Singh | |
| 2014/0015522 A1 | 1/2014 | Widmer et al. | |
| 2014/0111019 A1 | 4/2014 | Roy et al. | |
| 2014/0111154 A1* | 4/2014 | Roy | H02J 50/50 320/108 |
| 2015/0022014 A1 | 1/2015 | Tanabe | |
| 2015/0328996 A1* | 11/2015 | Czainski | B60M 1/04 320/108 |
| 2016/0218534 A1* | 7/2016 | Islinger | H02J 50/12 |
| 2016/0238731 A1* | 8/2016 | Chopra | G01V 3/101 |
| 2016/0341573 A1* | 11/2016 | Widmer | H01F 38/14 |
| 2016/0380469 A1* | 12/2016 | Lethellier | H01F 38/14 320/108 |
| 2017/0162931 A1 | 6/2017 | Young et al. | |
| 2017/0203657 A1 | 7/2017 | Ludwig et al. | |
| 2018/0269716 A1* | 9/2018 | Jang | H01F 27/366 |
| 2018/0331429 A1* | 11/2018 | Kornaros | H01Q 9/0414 |
| 2019/0006826 A1* | 1/2019 | Islinger | B60L 53/38 |
| 2019/0089206 A1 | 3/2019 | Sieber et al. | |
| 2019/0225099 A1* | 7/2019 | Sieber | H02J 50/60 |
| 2019/0237248 A1* | 8/2019 | Krammer | H01F 27/255 |
| 2019/0353816 A1* | 11/2019 | Widmer | B60L 53/60 |
| 2019/0356178 A1 | 11/2019 | Widmer et al. | |
| 2019/0363588 A1 | 11/2019 | Daetwyler et al. | |
| 2020/0039368 A1 | 2/2020 | Sieber et al. | |
| 2020/0200937 A1 | 6/2020 | Widmer et al. | |
| 2020/0212729 A1* | 7/2020 | Smith | H02J 50/40 |
| 2021/0124078 A1 | 4/2021 | Widmer et al. | |
| 2022/0006332 A1* | 1/2022 | Stingu | H02J 50/005 |

OTHER PUBLICATIONS

Kretschmar, Capacitive Sensor Operation Part 1: The Basics, pp. 1-5 2009 (Year: 2009).*

"Impedance Matching—Wikipedia", Retrieved at: https://web.archive.org/web/20190901154045/en.wikipedia.org/wiki/Impedance_matching, Sep. 1, 2019, 11 pages.

"International Search Report and Written Opinion", Application No. PCT/US2020/057139, dated Apr. 6, 2021, 17 pages.

"Invitation to Pay Additional Fees and Partial Search Report", Application No. PCT/US2020/057139, dated Feb. 12, 2021, 10 pages.

"International Preliminary Report on Patentability", Application No. PCT/US2020/057139, dated Apr. 26, 2022, 10 pages.

"International Search Report and Written Opinion", Application No. PCT/US2021/064858, dated Apr. 7, 2022, 12 pages.

"Non-Final Office Action", U.S. Appl. No. 17/077,124, dated Jun. 7, 2023, 21 pages.

"Restriction Requirement", U.S. Appl. No. 17/077,124, dated Mar. 24, 2023, 6 pages.

George, Boby, et al., "A Combined Inductive-capacitive Proximity Sensor and its Application to Sear Occupancy Sensing", May 2009, 5 pages.

Jeong, S Y, et al., "Living Object Detection System Based on Comb Pattern Capacitive Sensor for Wireless Ev Chargers", Dec. 2016, 6 pages.

* cited by examiner

WIRE-WOUND STRUCTURES FOR ELECTROMAGNETIC SENSING OF OBJECTS

CROSS-REFERENCE TO RELATED APPLICATIONS

The present application claims priority to U.S. Provisional Patent Application Ser. No. 63/141,730, filed Jan. 26, 2021, the entire disclosure of which is hereby incorporated by reference.

FIELD

The present disclosure generally relates to foreign object detection, for example, in an application for inductive wireless charging of electric vehicles. In particular, the present disclosure is directed to wire-wound structures configured for electromagnetic sensing of foreign objects located near an inductive wireless power transfer system.

BACKGROUND

Inductive wireless power transfer (WPT) systems provide one example of wireless transfer of energy. In an inductive WPT system, a primary power device (or wireless power transmitter) transmits power wirelessly to a secondary power device (or wireless power receiver). Each of the wireless power transmitter and wireless power receiver includes a wireless power transfer structure, typically a single or multi-coil arrangement of windings comprising electric current conveying materials (e.g., copper Litz wire). An alternating current passing through the coil e.g., of a primary wireless power transfer structure produces an alternating magnetic field. When a secondary wireless power transfer structure is placed in proximity to the primary wireless power transfer structure, the alternating magnetic field induces an electromotive force (EMF) into the coil of a secondary wireless power transfer structure according to Faraday's law, thereby wirelessly transferring power to the wireless power receiver if a resistive load is connected to the wireless power receiver. To improve a power transfer efficiency, some implementations use a wireless power transfer structure that is part of a resonant structure (resonator). The resonant structure may comprise a capacitively loaded inductor forming a resonance substantially at a fundamental operating frequency of the inductive WPT system (e.g., in the range from 80 kHz to 90 kHz).

Inductive WPT to electrically chargeable vehicles at power levels of several kilowatts in both domestic and public parking zones may require special protective measures for safety of persons and equipment. Such measures may include detection of foreign objects in an inductive power region of the inductive WPT system where electromagnetic field exposure levels exceed certain limits. This may be particularly true for systems where the inductive power region is open and accessible. Such measures may include detection of electrically conducting (metallic) objects that may be present within or near the inductive power region.

In certain applications for inductive wireless charging of electric vehicles, it may be useful to be able to detect foreign objects that may be present in the inductive power region and that could be susceptible to induction heating due to the high magnetic-field strength in that region. In an inductive wireless power transfer system for electric vehicle charging operating at a fundamental frequency in the range from 80 kHz to 90 kHz, magnetic flux densities in the inductive power region (e.g., above a primary wireless power transfer structure) can reach relatively high levels (e.g., above 2 millitesla (mT)) to allow for sufficient power transfer (e.g., 3.3 kilowatt (kW), 7 kW, 11 kW, and the like). Therefore, metallic objects or other objects present in the magnetic field can experience undesirable induction heating. For this reason, foreign object detection (FOD) may be implemented to detect metallic objects or other objects that are affected by the magnetic field generated by the primary and/or the secondary wireless power transfer structure of the inductive WPT system.

In certain applications for inductive wireless charging of electric vehicles, it may also be useful to be able to detect living objects that may be present within or near an inductive power region where the level of electromagnetic field exposure exceeds certain limits (e.g., as defined by the International Commission on Non-Ionizing Radiation Protection (ICNIRP) recommendation). For this reason, living object detection (LOD) may be implemented to detect living objects (e.g., human extremities, animals) or other objects that may be exposed to the magnetic field generated by the primary and/or the secondary wireless power transfer structure of the inductive WPT system.

An example FOD system based on inductive sensing using a plurality (e.g., an array) of sense loops (e.g., multi-turn sense loops) integrated into a surface of a wireless power transfer structure is described in U.S. Pat. No. 10,627,257, titled Systems, Methods, and Apparatus for Detection of Metal Objects in a Predetermined Space, the entire contents of which are hereby incorporated by reference. In this example FOD system, an electrical characteristic (e.g., an impedance, a transimpedance, a Q-factor, a dampening factor, an induced voltage, a pulse response, a response to a swept frequency signal or a pseudorandom signal) is measured in each of a plurality of sense circuits each including at least one of the plurality of sense loop. Presence of the foreign object located near the wireless power transfer structure (e.g., in the predetermined space) is determined in response to a change in the measured electrical characteristics.

Another example FOD system based on joint inductive and thermal sensing (inductive thermal sensing) using a plurality of sense loops is described in U.S. patent application Ser. No. 14/279,112 titled Systems, Methods, and Apparatus for Foreign Object Detection Loop Based on Inductive Thermal Sensing, the entire contents of which are hereby incorporated by reference. In this example FOD system, a foreign object is detected based on a change of the object's temperature when exposed to the WPT magnetic field. Metallic objects of certain categories have at least one electrical property (e.g., electrical conductivity, magnetic permeability) that changes as a function of temperature. An object of these categories in proximity of a sense loop potentially changes an electrical characteristic of the sense loop in response to a change of the object's electrical property when the object is heated (e.g., by induction heating as discussed above).

A further example FOD system based on inductive and thermal sensing (heat sensing) using a plurality of sense loops is described in U.S. Pat. No. 10,444,394 titled Foreign Object Detection Using Heat Sensitive Material and Inductive Sensing, the entire contents of which are hereby incorporated by reference. In addition to inductive sensing using the plurality of sense loops, this example FOD system uses a heat-sensitive material having a property configured to change as a function of temperature. This material may be integrated into a surface of a wireless power transfer structure.

An example LOD system based on capacitive sensing using a plurality (e.g., an array) of sense electrodes integrated into a surface of a wireless power transfer structure is described in U.S. Pat. No. 9,952,266, titled Object Detection for Wireless Energy Transfer Systems, and U.S. patent application Ser. No. 17/077,124, titled Circuit for Object Detection and Vehicle Position Determination, the entire contents of which are hereby incorporated by reference. In this example system, an electrical characteristic (e.g., an impedance, a transimpedance, a capacitance, a resistance, an induced voltage, a pulse response, a response to an arbitrary waveform signal) is measured in each of a plurality of sense circuits each including at least one of the plurality of sense electrodes. Presence of a living object located near the wireless power transfer structure is determined in response to a change in the measured electrical characteristic.

In an example wireless power transfer system, at least one of the FOD and the LOD system is also configured to detect one or more of a presence, a type, and a position of a vehicle above the ground-based wireless power transfer structure e.g., using a passive beacon transponder technique as described in U.S. patent application Ser. No. 16/052,445, titled Hybrid Foreign-Object Detection and Positioning System, the entire contents of which are hereby incorporated by reference and in U.S. patent application Ser. No. 17/077,124 as previously referenced.

U.S. Pat. No. 10,627,257 describes various implementations of a substantially planar conductive structure (e.g., an array of loops or coils) configured for inductive sensing of foreign objects. In an example implementation, the conductive structure includes loops of one or more turns of thin enameled copper wire. In another implementation, the conductive structure includes loops of one or more turns and is printed on one or more layers of a circuit board.

U.S. Pat. No. 9,952,266 and U.S. patent application Ser. No. 17/077,124 describe various implementations of a conductive structure (e.g., an arrangement of electrodes) configured for capacitive sensing of living objects. In an example implementation, the conductive structure includes finger-structured electrodes printed on a single layer circuit board. In another implementation, the conductive structure includes electrodes printed on an inner surface of a plastic enclosure of the wireless power transfer structure (e.g., using a Molded Interconnect Device (MID) technology). In a further implementation, the conductive structure is made of thin metal sheet and is embedded in the plastic enclosure of the wireless power transfer structure.

Printed circuit board (PCB) implementations have conventionally been a common solution for the conductive structure. However, employing advanced manufacturing and assembling processes involving highly efficient robots, production costs for a wire-wound structure (e.g., wire-wound coil arrays) can be substantially lowered and may potentially fall below that of a PCB solution. This may be particularly true for inductive sense coil arrays covering an area larger than a quarter of a square meter. Moreover, coils made of copper wire may have electrical properties that are more favorable for the sensing of foreign objects in the inductive power region of a WPT system compared to corresponding PCB coils.

SUMMARY

In certain aspects of this disclosure, an apparatus for detecting a presence of an object in a predetermined area of an inductive wireless power transfer system is provided. The apparatus comprises a first electrically conductive wire-wound structure configured for electromagnetic sensing of the object in a predetermined area and a substantially planar coil-former. The coil-former has a first surface and a second surface opposite to the first surface and is configured to form, carry, and hold in place the first wire-wound structure on the first surface and a second electrically conductive wire-wound structure on the second surface. The second wire-wound structure is configured to transfer power inductively. The apparatus further comprises a detection circuit coupled to the first wire-wound structure and configured to measure an electrical characteristic of the first wire-wound structure and to determine presence of the object in response to a change in the electrical characteristic.

In certain aspects of this disclosure, the first electrically conductive wire-wound structure comprises at least one piece of wire (e.g., an enameled copper wire) configured to form a double-wire lead line and a wire loop of one or more turns configured to sense the object inductively by means of an alternating magnetic field. Each wire end is further configured to provide a terminal to electrically connect the piece of wire to the detection circuit.

In certain aspects of this disclosure, the first electrically conductive wire-wound structure comprises at least one piece of wire (e.g., an enameled copper wire) configured to form a single-wire lead line and a substantially two-dimensional wire-wound structure configured to sense the object capacitively by means of an alternating electric field. One wire end is further configured to provide a terminal to electrically connect the piece of wire to the detection circuit.

In certain aspects of this disclosure, the coil-former is substantially formed of an electrically insulating material. It is configured to form and accommodate the first and second wire-wound structure and for automated robot winding of the first and second wire-wound structure.

BRIEF DESCRIPTION OF THE DRAWINGS

In the figures, the third and fourth digit of a reference number identify the figure in which the reference number first appears. The use of the same reference numbers in different instances in the description or the figures indicates like elements.

DETAILED DESCRIPTION

Figure 1:
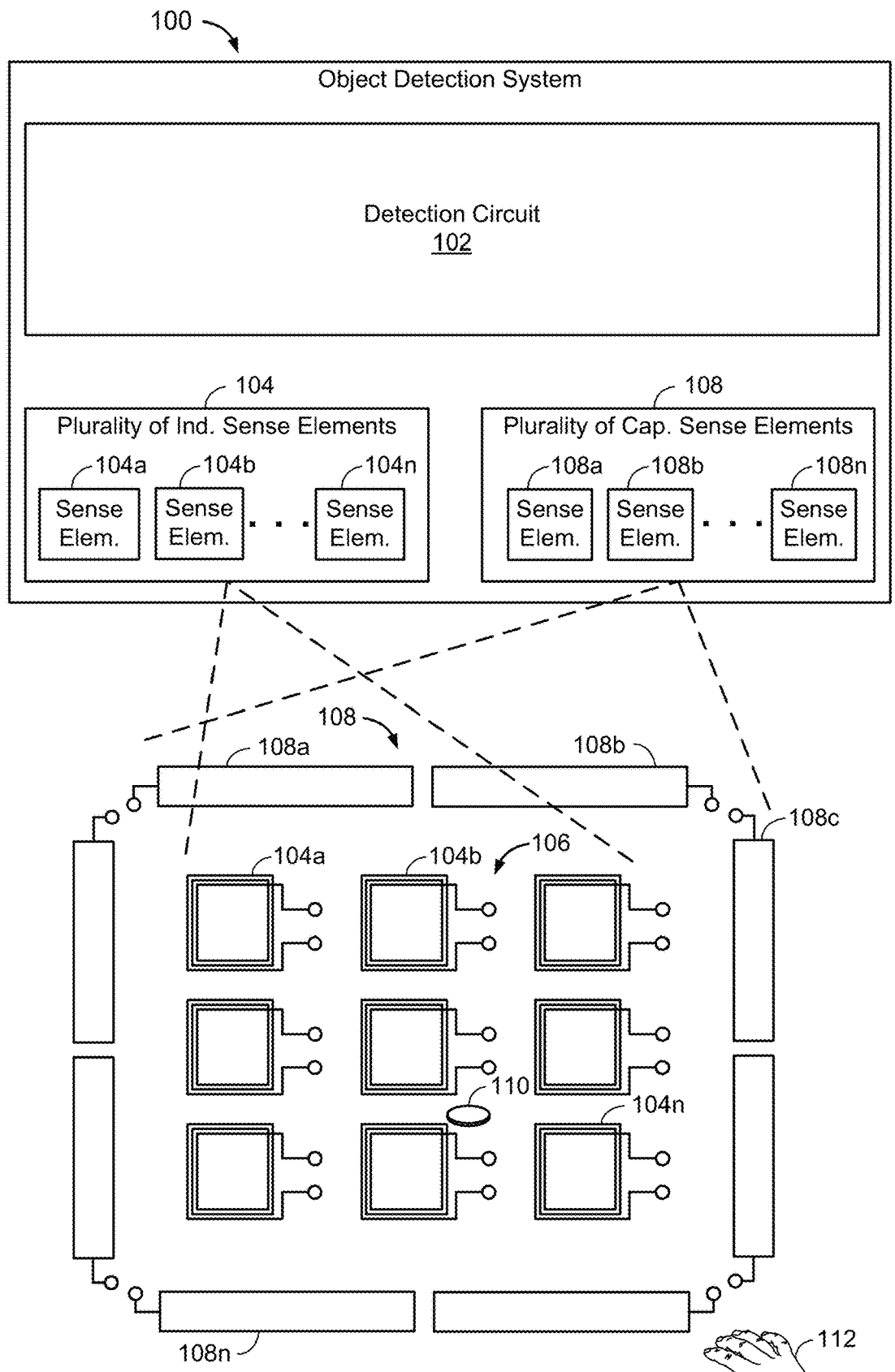
FIG. 1 is a schematic view illustrating an example implementation of an object detection system including a detection circuit, a plurality of inductive and capacitive sense elements, and a non-living (e.g., metallic) object, and a living object.

The detailed description set forth below in connection with the appended drawings is intended as a description of example implementations and is not intended to represent the only implementations in which the techniques described herein may be practiced. The term "example" used throughout this description means "serving as an example, instance, or illustration" and should not necessarily be construed as preferred or advantageous over other example implementations. The detailed description includes specific details for the purpose of providing a thorough understanding of the example implementations. In some instances, some devices are shown in block diagram form. Drawing elements that are common among the following figures may be identified using the same reference numerals.

As mentioned above, foreign object detection (FOD) (and particularly metal object detection) may be valuable for a variety of applications. For detection in a predetermined area, a FOD system may include a plurality of inductive sense elements (e.g., a sense coil) distributed across the predetermined area (e.g., a planar array of sense coils integrated into the ground-based wireless power transfer structure). The predetermined area may be defined by the space where metal objects may be found and where the magnetic flux density exceeds certain limits (e.g., a threshold determined based on what levels of temperature a metal object might be heated up). This is generally a three-dimensional space above the plurality of inductive sense elements. The number of the inductive sense elements may be related to the minimum size of objects that are desirable to be detected. For a system that is configured to detect small objects (e.g., a paper clip), the number of sense elements may be relatively high (e.g., 64).

As mentioned above, a FOD system including supplementary heat sensing of hot metal objects heated by the WPT magnetic field may be valuable for a variety of applications and for enhancing FOD e.g., with respect to reliability and foreign object handling as disclosed in U.S. Pat. No. 10,444,394. For detection in a predetermined area, a FOD system may include heat sensing elements using heat-sensitive materials having a property configured to change as a function of a temperature at the location of the heat sensing element.

As mentioned above living object detection (LOD) (e.g., human extremities, animals) may be valuable for a variety of applications. For detection in a predetermined area, a LOD system may include a plurality of capacitive sense elements (e.g., a sense electrode) e.g., disposed along the periphery (edge area) of a ground-based wireless power transfer structure of a WPT system. The predetermined area may be defined by the space accessible for living objects where living objects may be located and where the exposure magnetic field strength exceeds certain limits (e.g., as recommended by ICNIRP). This is generally a three-dimensional space. The number of the capacitive sense elements may be related to the minimum size of living objects that are desirable to be detected. For a system that is configured to detect human extremities (e.g., a hand) and animals (e.g., a cat), the number of capacitive sense elements may be relatively low (e.g., in the order of 4).

As mentioned above, vehicle detection (VD), the detection of the type of vehicle, or determination of a position of the vehicle (PD) relative to the ground-based wireless power transfer structure, may be valuable for a variety of applications. For detection of a vehicle, the type or position of the vehicle, a VD or PD system may include a plurality of inductive sense elements (e.g., sense coils) distributed across an area defined by the ground-based wireless power transfer structure (e.g., a planar array of sense coils) and a plurality of capacitive sense circuits each including a capacitive sense element (e.g., a sense electrode) disposed in an area defined by the ground-based wireless power transfer structure.

A FOD and LOD system may include detection circuitry for applying drive signals to each of the plurality of inductive, capacitive, and heat sensing elements, and for measuring an electrical characteristic in each of the plurality of sense elements and for looking for changes in the electrical characteristics that may correspond to the presence of an object, a hot object, a living object, or a vehicle.

An electric vehicle is used herein to describe a remote system, an example of which is a vehicle that includes, as part of its locomotion capabilities, electrical power derived from a chargeable energy-storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like.

A foreign object is used herein to describe an object that does not naturally belong to the WPT system. A foreign object may include a metallic object, a non-living dielectric (substantially non-conductive) object, a living object (e.g., an animal, a human extremity), a vehicle, or a combination thereof. It may describe an object that needs to be detected for purposes of safety of equipment or persons, but it may also refer to an object of no harm.

FIG. 1 illustrates an example implementation of an object detection system 100 that includes a detection circuit 102 and a plurality of inductive sense elements 104 and a plurality of capacitive sense elements 108 illustrated in FIG. 1 by inductive sense elements 104*a*, 104*b*, . . . , and 104*n*; and by capacitive sense elements 108*a*, 108*b*, some dots, and 108*n*. The dots shall indicate that the number of inductive sense elements 104 and/or the number of capacitive sense elements 108 may be greater than three. The plurality of inductive sense elements 104 is also sometimes referred to herein as the plurality of inductive sense elements 104*a*, 104*b*, . . . , 104*n*. Likewise, the plurality of capacitive sense elements 108 is also sometimes referred to herein as the plurality of capacitive sense elements 108*a*, 108*b*, . . . , 108*n*.

FIG. 1 also illustrates foreign objects 110 and 112 as referred to herein as the non-living object and the living object, respectively. The non-living object 110 may represent a metallic (substantially electrically conductive object) that is potentially heated when exposed to the WPT magnetic field as previously discussed. But the object may also be representative of a dielectric or ferromagnetic object that is substantially electrically non-conductive and that does not heat to critical (e.g., hazardous) temperatures when exposed to the WPT magnetic field. The living object 112 may stand for a human extremity (e.g., a hand as depicted in FIG. 1) or an animal.

The inductive sense elements 104 and capacitive sense elements 108 are configured to sense at least one of a presence of a foreign object (e.g., non-living object 110) in proximity to at least one of the plurality of inductive sense elements 104, a living object (e.g., living object 112) in proximity to at least one of the plurality of capacitive sense elements 108, a vehicle or type of vehicle (not shown in FIG. 1) positioned above the plurality of inductive and capacitive sense elements 104 and 108, respectively, and for determining a vehicle position. Inductive and capacitive sensing is based on measuring one or more electrical characteristics (e.g., an impedance, a transimpedance, a voltage, a current, a pulse response) in each of the plurality of inductive sense elements 104 and capacitive sense elements 108 and further based on detecting changes in the measured one or more electrical characteristics.

The object detection system 100 may also include detection of hot foreign objects (e.g., non-living object 110) based on heat sensing as mentioned above. In some implementations, heat sensing is accomplished using supplementary (dedicated) sense elements (not shown in FIG. 1) configured to have an electrical characteristic that changes as a function of a temperature. In other implementations, heat sensing is performed using the plurality of inductive sense elements 104, each configured to have an electrical characteristic that also changes as a function of temperature. A heat-sensitive inductive sense element (e.g., inductive sense element 104*a*) includes a heat-sensitive material having a property configured to change as a function of temperature. In some implementations, the conductive structures configured for inductive sensing include a heat-sensitive material e.g., configured to have a heat-sensitive electrical resistance. In other implementations, a heat-sensitive material is included in an insulating material e.g., configured to have an electrical property (e.g., insulation resistance, impedance, magnetic permeability, electric permittivity) configured to change as a function of temperature. In further implementations, the insulating structure (not shown in FIG. 1) that carries the plurality of inductive sense elements 104 (e.g., array 106) includes the heat-sensitive material as described above. In yet other implementations, heat sensing is also included in the plurality of capacitive sense elements 108, each configured to have an electrical characteristic that also changes as a function of temperature.

Each of the plurality of inductive sense elements 104 is shown in FIG. 1 as a "circular" coil for purposes of illustration. However, in other implementations, the inductive sense elements 104 may include a sense coil (e.g., a multi-turn loop) having another coil topology, e.g., a "figure-eight-like" topology. In yet other implementations, the plurality of inductive sense elements 104, may include sense coils of a mixed coil topology, e.g., "circular" and "figure-eight-like," In further implementations, the plurality of inductive sense elements 104 may include sense coils (e.g., solenoid coils) with a ferrite core (not shown herein) that are physically smaller compared to "air" coils. In some implementations (not shown herein), each of the plurality of inductive sense elements 104 may include a double or even a triple sense coil arrangement that may be used in conjunction with a transimpedance or mutual impedance measurement technique or using another two-port electrical characteristic between sense coils.

In some implementations, the plurality of inductive sense elements 104*a*, 104*b*, 104*n* is arranged in an array 106, such as a two-dimensional array 106, as shown in FIG. 1. However, in other implementations, the sense elements of the plurality of inductive sense elements 104*a*, 104*b*, . . . , 104*n* are arranged in other configurations that do not conform to rows or columns (radial or interleaved), are at least partially overlapping or have irregular spacing, have different size, have different shapes (circular, hexagonal, etc.), cover irregular detection areas, or any combination thereof. As such the term "array" as used herein denotes a plurality of sense elements that are arranged over a predetermined area. Furthermore, the number of sense elements of an array 106 and thus the number of sense circuits can vary widely based on the application, including the total region in which a foreign object (e.g., non-living object 110) is to be detected and the smallest size of the object detection system 100 is configured to detect. Example implementations of the inductive sense element (e.g., 104*a*) and arrangements of inductive sense elements are described in U.S. Pat. No. 9,726,518, titled Systems, Methods, and Apparatus for Detection of Metal Objects in a Predetermined Space, in U.S. patent application Ser. No. 16/358,534, titled Foreign Object Detection Circuit Using Mutual Impedance Sensing, in U.S. Pat. No. 10,122,192, titled Sense Coil Geometries with Improved Sensitivity for Metallic Object Detection in a Predetermined Space, in U.S. Pat. No. 10,124,687, titled Hybrid Foreign Object Detection (FOD) Loop Array Board, the entire contents of which are hereby incorporated by reference.

Each capacitive sense element (e.g., capacitive sense element 108*a*), as shown in FIG. 1, includes a single electrode providing a single terminal. In other implementations, the capacitive sense elements 108 may be double-ended electrodes configured e.g., for differential mode sensing. As with the inductive sense elements 104, the capacitive sense elements may be driven and configured for measuring one or more of an impedance, a transimpedance (e.g., a mutual impedance), and another two-port electrical characteristic as defined between electrodes. In FIG. 1, the capacitive sense elements 108 are shown arranged in a peripheral area around the array of inductive sense elements 104. However, in other implementations, the capacitive sense elements of the plurality of capacitive sense elements 108 are arranged in other configurations, e.g., distributed over the area of the array of inductive sense elements 104. Example implementations of the capacitive sense element (e.g., 108*a*) and arrangements of capacitive sense elements are described in U.S. Pat. No. 9,952,266 as previously referenced.

Each of the plurality of inductive sense elements 104 and the plurality of capacitive sense elements 108 are operably coupled to a detection circuit 102. The detection circuit 102 may be configured to selectively and sequentially measure one or more electrical characteristics in each of the plurality of inductive sense elements 104 and capacitive sense elements 108 and to provide outputs indicative of the presence of an object (e.g., non-living object 110).

The detection circuit 102 is configured to cause each of the plurality of inductive sense elements (e.g., sense coils) 104*a*, 104*b*, . . . , 104*n* to selectively and sequentially generate an alternating magnetic field at the sense frequency, e.g., by selectively and sequentially applying a sense signal (e.g., a current) to each of the plurality of inductive sense elements 104. If a metallic object (e.g., non-living object 110) is present in the alternating magnetic field, eddy currents will be generated in the object. According to Lenz's law, the eddy currents in the object will generate another (e.g., opposing) magnetic field that interacts with the primary magnetic field as generated by the respective sense element, and a mutual coupling between object and sense element is developed. This may cause a change in an electrical characteristic (e.g., an impedance) as measured by the detection circuit 1042 in the respective inductive sense elements (e.g., inductive sense element 104*a*). A change in a measured electrical characteristic may also be caused by a substantially non-conductive but ferromagnetic object with a relative permeability $\mu_r > 1$ that interacts with the alternating magnetic field as generated by the respective sense element. Applying a sense signal to an inductive sense element (e.g., inductive sense element 104*a*) may also cause the respective inductive sense element to generate an alternating electric field that may interact with a substantially non-conductive, dielectric object (e.g., living object 112), causing a change in the electrical characteristic as measured in the respective inductive sense element (capacitive sensing effect).

The detection circuit 102 is further configured to cause each of the plurality of capacitive sense elements (e.g., sense electrodes) 108*a*, 108*b*, . . . , 108*n* to selectively and sequentially generate an alternating electric field at the sense frequency, e.g., by selectively and sequentially applying a sense signal (e.g., a voltage) to each of the plurality of capacitive sense elements 108. If a substantially non-conductive, dielectric object (e.g., living object 112 or non-living object 110) with a relative permittivity $\varepsilon_r > 1$ is present in the alternating electric field, it will interact with the electric field. This may cause a change in an electrical characteristic (e.g., an impedance) as measured by the detection circuit 102 in the respective capacitive sense circuit (e.g., capacitive sense element 108*a*). A change in a measured electrical characteristic may also be caused by a metallic object (e.g., non-living object 110) as it will also interact with an alternating magnetic field as generated by the respective capacitive sense element.

Figure 3:
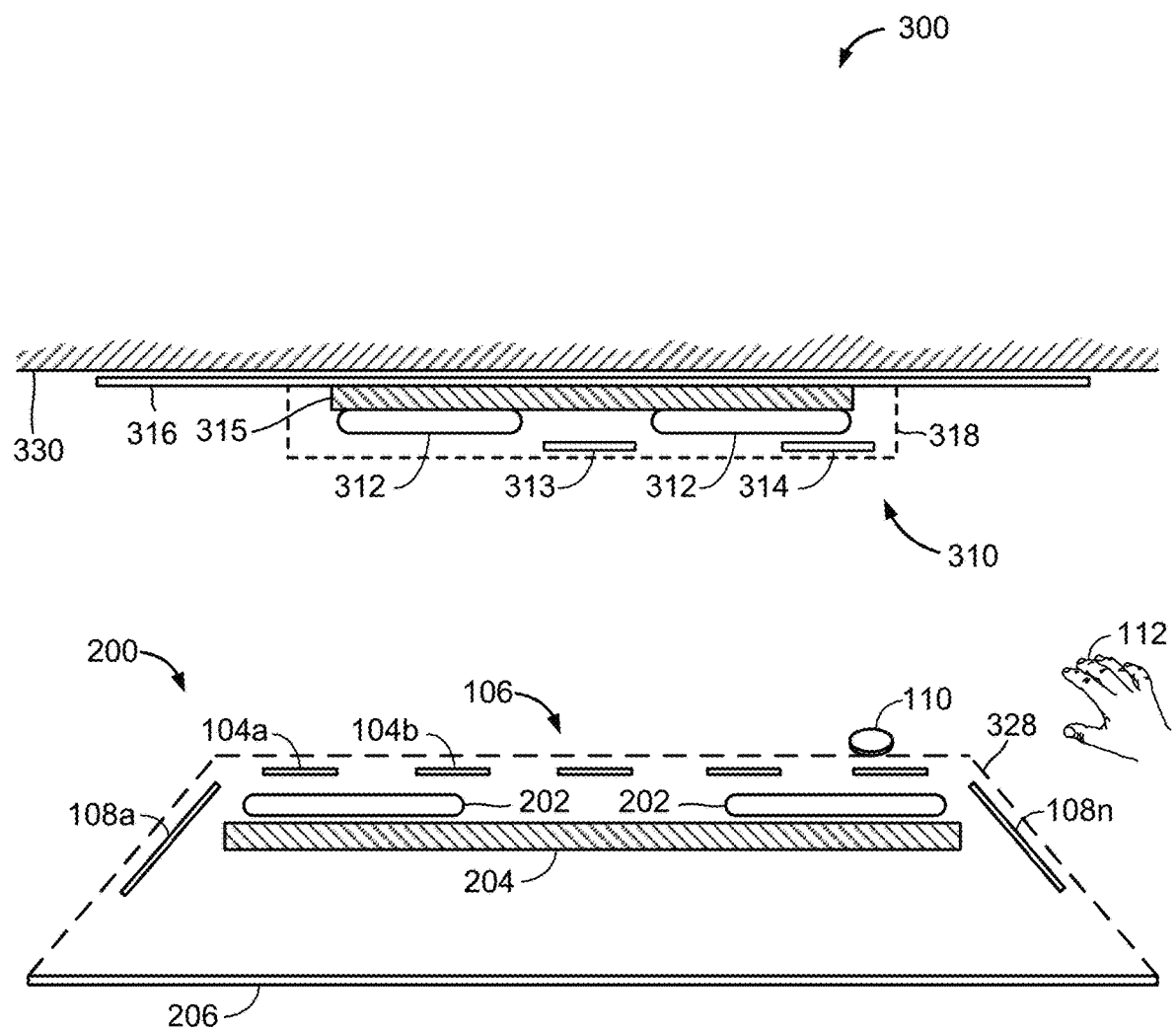
FIG. 3 is a vertical cut view illustrating a portion of an inductive wireless power transfer system including the vehicle-based wireless power transfer structure and the ground-based wireless power transfer structure including a wireless power transfer coil and the inductive and capacitive sense elements of FIG. 1, and the non-living and the living object of FIG. 1.

The detection circuit 102 is configured to determine at least one of a presence of a foreign object (e.g., non-living object 110), a living object (e.g., living object 112), a presence of a vehicle with reference to FIG. 3, a type of vehicle, and a vehicle position based on changes in the measured one or more electrical characteristics. In some implementations, the detection circuit 102 may include the decision functions as needed for FOD, LOD, and VD, as well as the position calculation functions needed for PD. In other implementations, the vehicle position is determined in a unit external to the object detection system 100 (not shown herein) based on outputs (e.g., raw data) from the detection circuit 102 and on outputs provided by other ground- or vehicle-based sensors (not shown herein).

Figure 2:
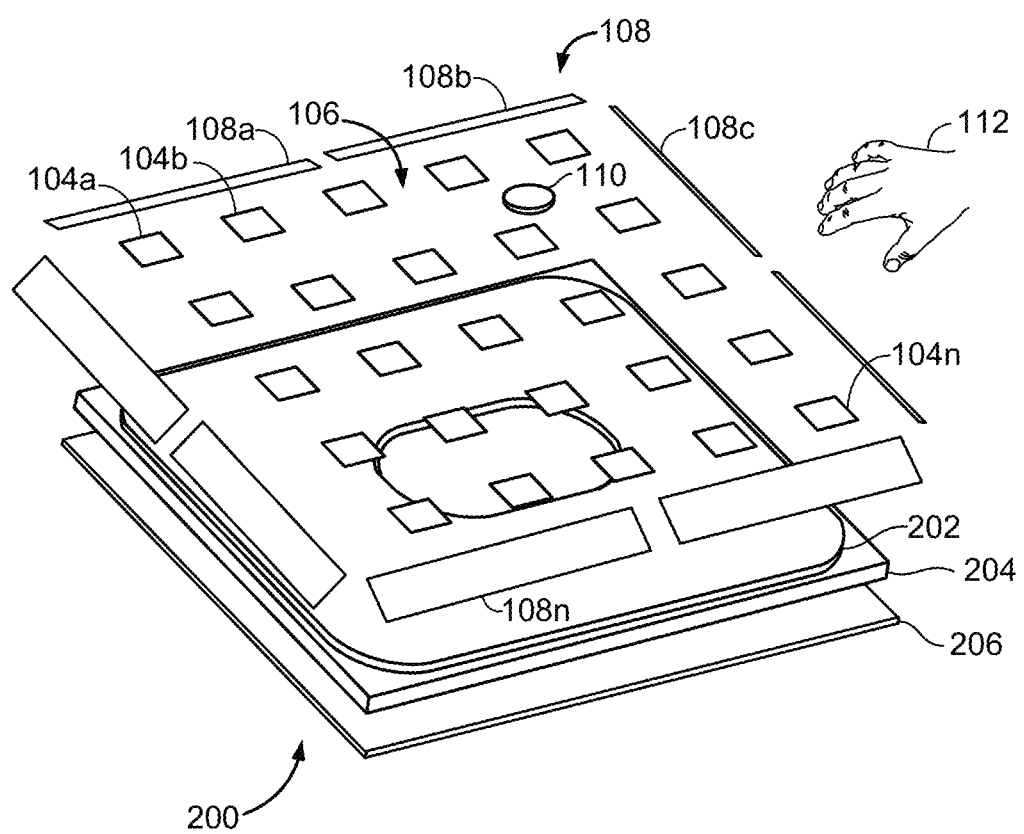
FIG. 2 is a schematic view illustrating an example implementation of a wireless power transfer structure of an inductive wireless power transfer system integrating the plurality of inductive and capacitive sense elements of FIG. 1, as well as the non-living and the living object of FIG. 1.

FIG. 2 illustrates an example implementation of a wireless power transfer structure 200 that is a portion of a WPT system including a portion of the object detection system 100 of FIG. 1. The wireless power transfer structure 200 may depict either a wireless power transmitter that generates a magnetic field (e.g., at an operating frequency in the range from 80-90 kHz) for transferring power or a wireless power receiver that can couple and receive power via a magnetic field. It may be more likely that, when integrated with an object detection system 100, the wireless power transfer structure 200 may be a wireless power transmitter as power may be generally transferred from the ground or other upward-facing surface where a foreign object (e.g., non-living object 110) will generally come to a rest. However other implementations are possible, e.g., the object detection system 100 or a portion thereof may also be integrated into a wireless power receiver (e.g., a vehicle-based wireless power transfer structure). The wireless power transfer structure 200 (also sometimes referred to as a "ground assembly" or "base bad") may be configured to wirelessly transmit or receive power.

The wireless power transfer structure 200 includes a coil 202 (e.g., a Litz wire coil), also referred to herein as the wireless power transfer coil that is configured to generate an alternating magnetic field when driven with a current by a power conversion-circuit (not shown herein). The wireless power transfer structure 200 may further include a ferrite structure 204 configured to channel and/or provide a path for magnetic flux (e.g., may be arranged in one or more ferrite tiles). The wireless power transfer structure 200 may also include a metal shield 206 (also sometimes referred to as a back plate). The metal shield 206 is configured to prevent the magnetic field or associated electromagnetic emissions from extending far beyond a boundary determined by the shield 206 or at least to attenuate the magnetic field extending beyond that boundary. As an example, the shield 206 may be formed from aluminum.

FIG. 2 illustrates one example of how the plurality of inductive sense elements (array 106) and the plurality of capacitive sense elements 108 of FIG. 1 may be integrated into the wireless power transfer structure 200.

FIG. 3 illustrates a vertical cut view of a portion 300 of a WPT system applicable to wireless electric vehicle charging. This portion 300 includes the ground-based (e.g., transmit) wireless power transfer structure 200 with reference to FIG. 2 and the vehicle-based (e.g., receive) wireless power transfer structure 310. The ground-based wireless power transfer structure 200 includes the shield (back plate) 206, the ferrite structure 204, and a wireless power transfer coil 202 with reference to FIG. 2. It also includes a housing 328 configured to house the wireless power transfer coil 202, the ferrite structure 204, and the shield 206. In addition, the housing 328 is configured to house the plurality of inductive sense elements (array 106) and the plurality of capacitive sense elements (108) as part of the object detection system 100 as illustrated in FIG. 2. In some implementations, the shield 206 may form a portion of the housing 328, as illustrated in FIG. 3. Further, the housing 328 may be inclined along its perimeter from its edge toward its interior to form a ramp over which a vehicle may drive. The power-conversion circuit (not shown herein) may be electrically connected to the wireless power transfer coil 202, a portion or all of which may also be housed in the housing 328. In an aspect, the capacitive sense elements (e.g., the capacitive sense elements 109a, 109b, . . . , 109n) may be oriented to be nonparallel with a plane defined by the array 106 of inductive sense elements. For example, the capacitive sense elements may be slanted e.g., oriented to be substantially parallel to the inclined top surface of the housing 328 along the housing's perimeter.

The vehicle-based wireless power transfer structure 310 includes a wireless power transfer coil 312, a layer of ferrite 315, and a shield 316 made of an electrically conductive material. In some implementations, the shield 316 may be formed from a portion of the apparatus that the ferrite 315 and the wireless power transfer coil 312 are affixed to, which may be the metallic underbody of a vehicle 330. In this case, a housing 318 configured to house the wireless power transfer coil 312 and ferrite 315 is provided, though the housing 318 may not house the shield 316. Other implementations are possible, however, where a conductive back plate is included in the housing 318. A power-conversion circuit (not shown herein) may be electrically connected to the wireless power transfer coil 312 or a portion or all may also be housed in the housing 318.

As mentioned above and as illustrated in FIG. 3, the vehicle-based wireless power transfer structure 310 may also integrate at least one of an inductive passive beacon transponder 313 and a capacitive beacon transponder 314, e.g., for purposes of VD and PD as previously discussed. The inductive passive beacon transponder 313 may be configured to primarily interact with the inductive sense elements e.g., the inductive sense elements 104 as described in more detail e.g., in U.S. patent application Ser. No. 16/052,445 as previously referenced. Analogously, the capacitive passive beacon transponder 314 may be configured to primarily interact with the capacitive sense elements, for example, the capacitive sense elements 108, (e.g., as described in U.S. patent application Ser. No. 17/077,124 as previously referenced). In further implementations, the passive beacon transponder (e.g., passive beacon transponder 313) is configured to interact with both the inductive and capacitive sense elements of the object detection system 100.

The ground-based (e.g., transmit) wireless power transfer structure 200 may be configured to generate a magnetic field 232. The vehicle-based wireless power transfer structure 310 may be configured to inductively receive power via the magnetic field. Furthermore, as the ground-based wireless power transfer structure 200 may be positioned on a ground or other top facing surface, a foreign object (e.g., non-living object 110) may come to rest at the top surface of the housing 328 as illustrated in FIG. 3. The object may thereby be potentially exposed to high levels of magnetic flux density if power is being transferred.

Figure 4A:
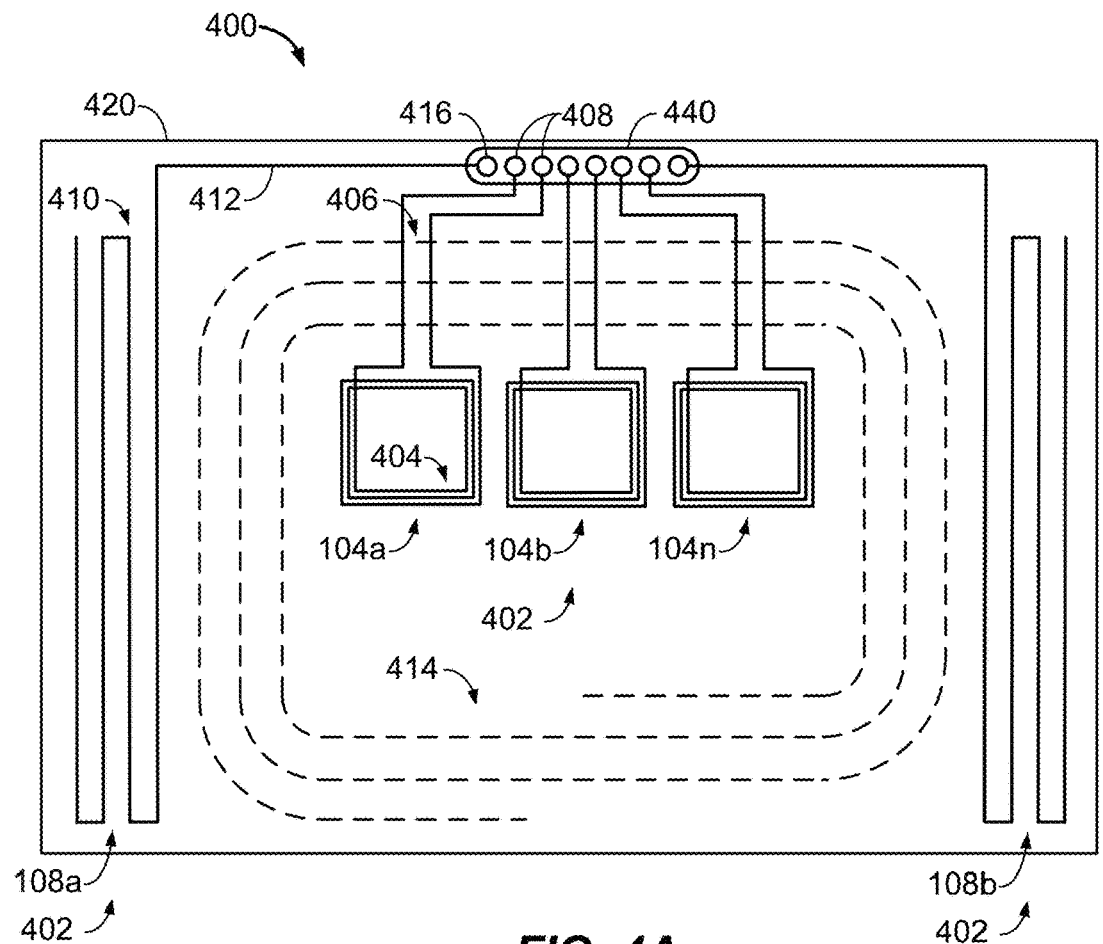
FIG. 4A is a schematic top-down view illustrating an example implementation of a coil assembly including a coil-former, a first electrically conductive wire-wound structure configured for inductive sensing and capacitive sensing, and a second electrically conductive wire-wound structure configured for inductive wireless power transfer.

FIG. 4A is a top-down schematic view illustrating an example implementation of a portion of the object detection system 100 of FIG. 1 including a coil-former 420 and a first wire-wound structure 402 configured for inductive and capacitive sensing of the object (e.g., non-living object 110 and 112). The portion is also referred to herein as a coil assembly 400. The coil-former 420 is a substantially planar structure providing a top surface and a bottom surface. The first wire-wound structure 402 is attached to the top surface and configured to form inductive sense elements (e.g., sense coils) 104a, 104b, and 104n and single-ended capacitive sense elements (e.g., sense electrodes) 108a and 108b, e.g., with reference to FIGS. 1 and 2. Though the plurality of sense elements 104 and 108 may comprise a larger number of sense elements, only three inductive and two capacitive sense elements are shown in FIG. 4A for purposes of illustration. The capacitive sense elements 108a and 108b are disposed in edge areas of the coil-former 420, which may be more favorable with respect to capacitive sensing of living objects (e.g., living object 112) approaching the wireless power transfer structure 200. FIG. 4A also illustrates a second electrically conductive wire-wound structure 414 (dashed line) attached to the bottom surface of the coil-former 420. The second wire-wound structure 414 may be the wireless power transfer coil 202 of the wireless power transfer structure 200 with reference to FIG. 2.

Each inductive sense element (e.g., inductive sense element 104a) of the first wire-wound structure 402 is created by winding a piece of wire and provides a pair of terminals 408 (wire ends) electrically connected to a connector 440 (e.g., a multi-pin connector as illustrated in FIG. 4A). Each capacitive sense element (e.g., capacitive sense element 108a) of the first wire-wound structure 402 is also created by winding a piece of wire and provides a single terminal 416 (wire end) electrically connected to the connector 440.

In some implementations, different wire materials are used to wind the first wire-wound structure 402 and the second wire-wound structure 414 configured for the inductive power transfer. In an example coil assembly 400, a first wire material (e.g., a single enameled copper wire with a diameter less than 1 mm) is used to wind the inductive sense elements 104 and a second wire material (e.g., a high-frequency Litz wire composed of a plurality of enabled copper wires with an overall diameter larger than 4 mm) is used to create the wire-wound structure 414. In another example coil assembly 400, a first wire material with a diameter smaller than 1 mm is used to wind the plurality of inductive sense elements 104, while a second wire material with a diameter larger than 2 mm is used to create the plurality of capacitive sense elements 108, e.g., for purposes of increasing a capacitance of the capacitive sense element 108 (e.g., sense electrode). In a further example coil assembly 400, the first wire-wound structure 402 or portions thereof is wound with a wire of at least one of aluminum, an alloy (e.g., copper alloy), and a material with a relatively high electrical resistance (e.g., higher than that of copper).

In an aspect of connecting the wire ends (e.g., wire terminal 416) to the connector 440, the wire-wound structure 402 may be wound using one or more of a non-insulated copper wire, a directly solderable enameled copper wire (e.g., with an enamel that melts away at a soldering temperature above 400° C.), a magnetic wire for wire-wrapping based on magnetics, a wire configured for wire-wrapping based on cold welding a tin plated copper wire.

In an aspect of electrical properties, the wire-wound structure 402 may be wound using one or more of a high-frequency Litz wire, a twisted multi-filar wire, a wire bundle, a low electrical-resistance wire, a high electrical-resistance wire, a temperature-compensated electrical resistance wire, a heat-sensitive resistance wire as previously discussed with reference to FIG. 1.

In an aspect of heat resistance, the wire-wound structure 402 may be wound using a wire with a heat-resistant insulation, e.g., to prevent the wire from insulation damage due to a hot object (e.g., non-living object 110) resting on the top surface of the ground-based wireless power transfer structure 200.

In some implementations including heat sensing as previously described e.g., with reference to FIG. 1, the first wire-wound structure 402 includes a heat-sensitive wire material having an electrical property (e.g., resistance, insulation resistance) configured to change as a function of temperature. In an example implementation, the first wire-wound structure 402 includes supplementary (dedicated) wire-wound structures configured for heat sensing (not shown in FIG. 4A). In another example implementation, at least a portion of the first wire-wound structure 402 is also configured for heat sensing, e.g., using a wire material having an electrical property that change as a function of temperature. Heat sensitive materials potentially applicable to the wire-wound structure 402 are mentioned in U.S. Pat. No. 10,444,394.

In some implementations, the connector 440 is configured to electrically connect or disconnect the coil assembly 400 to or from the detection circuit 102 of the object detection system 100. In certain implementations, the connector 440 provides a soldered (fixed) connection, while in other implementations, the connector 440 is a plug-in connector, e.g., to ease a process of assembly or disassembly of the wireless power transfer structure 200.

In the example implementation illustrated in FIG. 4A, each wire piece of the plurality of inductive sense elements 104 is wound to form a multi-turn wire loop 404 and a double-wire lead line 406. Each multi-turn wire loop 404 constitutes a sense coil configured to sense an object (e.g., non-living object 110) inductively. Analogously, each wire piece of the plurality of capacitive sense elements 108 is wound to form a substantially two-dimensional (2D) wire-wound structure 410 and a single-wire lead line 412. Each 2D wire-wound structure 410 constitutes a sense electrode used to sense an object (e.g., living object 112) capacitively. In aspects, a predetermined area for sensing the object inductively differs from a predetermined area for sensing the object capacitively.

In some implementations, the 2D wire-wound structure 410 is one of a folded wire-wound structure, a spiral wire-wound structure, a serpentine wire-wound structure, and a meander wire-wound structure.

Further, in some implementations, the double-wire lead line 406 is configured to have an inductance substantially smaller than the inductance of the entire inductive sense element (e.g., inductive sense element 104a), where the inductance refers to the inductance as measured at the corresponding terminals 408 and at a wavelength substantially longer than the length of the wire piece and where the inductance of the double-wire lead line 406 refers to the short circuit inductance. Likewise, the single-wire lead line 412 may be configured to have a capacitance substantially smaller than the capacitance of the entire capacitive sense element (e.g., capacitive sense element 108a), where the capacitance refers to the capacitance as measured at the corresponding terminal 416 and at a wavelength substantially longer than the length of the wire piece and where the capacitance of the single-wire lead line 412 refers to the open-circuit capacitance. More specifically, the capacitance may refer to the capacitance as measured between terminal 416 and a ground reference (e.g., the shield 206 of the wireless power transfer structure 200 with reference to FIG. 2). Alternatively, the capacitance may refer to the capacitance as measured between terminal 416 of a first capacitive sense element (e.g., capacitive element 108a) and terminal 416 of a second capacitive sense element (e.g., capacitive sense element 108b).

The coil-former 420 is substantially from an electrically non-conductive (insulating) material and configured to form, carry, and hold in place the first wire-wound structure 402 and the second wire-wound structure 414. In some implementations, the coil-former 420 includes one or more of a plastic material, a composite material, and a carbon material.

In an aspect of heat sensing as previously described, e.g., with reference to FIG. 1, the coil-former 420 includes a heat-sensitive material having a property (e.g., insulation resistance, impedance, magnetic permeability, electric permittivity) configured to change as a function of temperature. In an example implementation, the heat-sensitive materials include at least one of a heat-sensitive metal and a heat-sensitive plastic embedded in the coil-former 420. In another example implementation, the coil-former 420 is from a heat-sensitive compound. Heat-sensitive materials potentially applicable to the coil-former 420 are mentioned in U.S. Pat. No. 10,444,394 as previously referenced.

In an aspect of capacitive sensing, the coil-former 420 is substantially from a material having a low electric permittivity (e.g., a relative permittivity below 3).

In an aspect of heat resistance, the coil-former 420 is substantially from a heat resistant material to prevent damage due to a hot object (e.g., non-living object 110) resting on the top surface of the ground-based wireless power transfer structure 200. In some implementations, the coil-former is substantially from one or more of an epoxy material, a glass fiber reinforced material, and a ceramic material. Further, heat resistant materials potentially suitable for the coil-former 420 are mentioned in U.S. Pat. No. 10,444,394.

In an aspect of mechanical strength, the coil-former 420 is substantially from one or more of an epoxy material and a glass-fiber-reinforced material.

In the example implementation shown by FIG. 4A, the coil-former 420 also integrates the connector 440. In some implementations, the coil-former 420 integrates more than one multi-pin connector 440 disposed at different locations of the coil-former 420. In an aspect of integration into the wireless power transfer structure (e.g., wireless power transfer structure 200), the one or more multi-pin connectors 440 are disposed in a peripheral area of the coil-former 420 as shown in FIG. 4A by example.

In an aspect of manufacturing, the coil-former 420 is configured for fabrication using one or more of a machining technique, an injection molding technique, a casting technique, a pouring technique, a thermoforming technique, and a compression-forming technique.

Figure 4B:
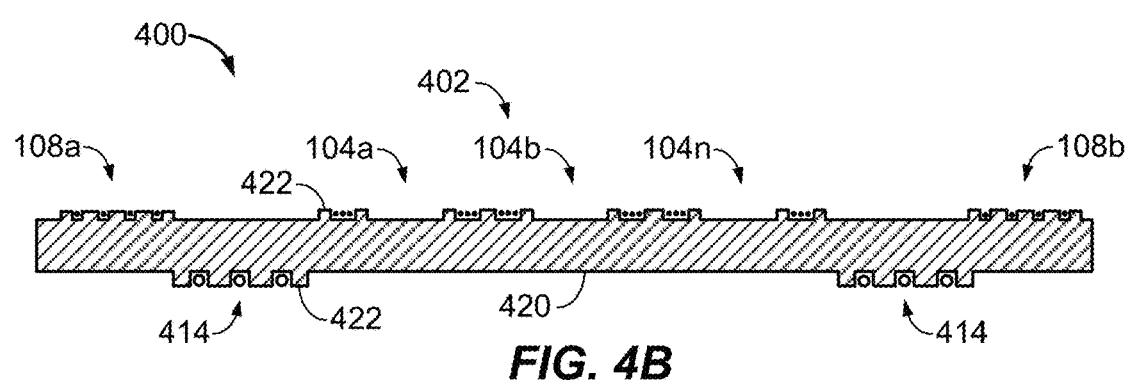
FIG. 4B is a schematic vertical cut view illustrating an example implementation of the coil assembly of FIG. 4A including the coil-former of FIG. 4A configured with a protrusive structure to form, carry, and hold in place the first and second wire-wound structures of FIG. 4A.

FIG. 4B is a schematic vertical cut view of an example implementation of the coil assembly 400 with reference to FIG. 4A. FIG. 4B illustrates the substantially planar coil-former 420, the first wire-wound structure 402 attached to the top surface, and the second wire-wound structure 414 attached to the bottom surface of the coil-former 420. In the implementation shown in FIG. 4B, the coil-former 420 provides protrusive structures 422 (e.g., braces, railings) to form, carry, and hold in place the first and second wire-wound structure 402 and 414, respectively. A coil-former 420 may be considered protrusively structured if the structured area of the coil-former's 420 surface is smaller than the non-structured area. Further, FIG. 4B indicates portions of the first wire-wound structure 402 configured as inductive sense elements 104a, 104b, and 104n and portions configured as capacitive sense elements 108a and 108b. In some implementations, the protrusively structured coil-former 420 of FIG. 4B is configured to separate the first wire-wound structure 402 from the second wire-wound structure 414 by at least 5 mm.

Figure 4C:
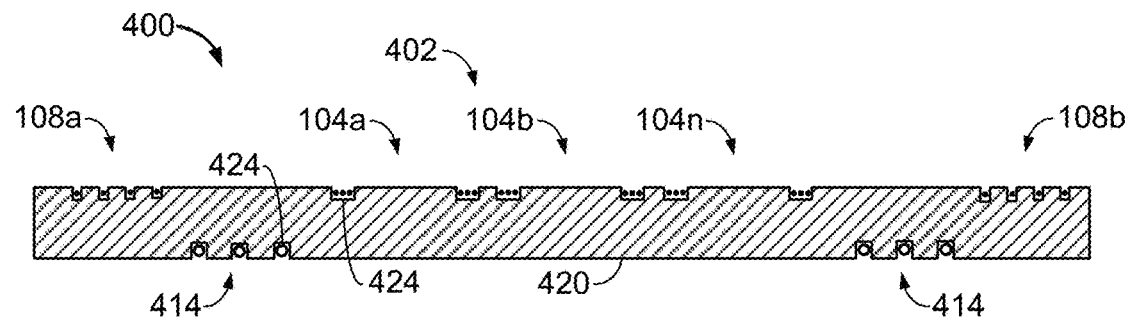
FIG. 4C is a schematic vertical cut view illustrating another example implementation of a coil assembly of FIG. 4A with the coil-former configured with a recessed (groove) structure to form, carry, and hold in place the first and second wire-wound structures of FIG. 4A.

FIG. 4C is a schematic vertical cut view illustrating another example implementation of the coil assembly 400 with reference to FIG. 4A. The coil assembly 400 includes the substantially planar coil-former 420, the first wire-wound structure 402 attached to the top surface of the coil-former 420, and the wire-wound structure 414 attached to its bottom surface. The coil-former 420 provides recessed structures 424 (e.g., grooves, channels) configured to form, carry, and hold in place the first and second wire-wound structure 402 and 414, respectively. For example, at least a portion of the first and second wire-wound structures 402 and 414, respectively, may be placed inside a groove. A coil-former 420 may be considered recessed structured if the structured area of the coil-former's 420 surface is smaller than the non-structured area. Further, FIG. 4C indicates portions of the first wire-wound structure 402 configured as inductive sense elements 104a, 104b, and 104n and portions configured as capacitive sense elements 108a and 108b. In some implementations, the recessed structured coil-former 420 of FIG. 4B is configured to separate the first wire-wound structure 402 from the second wire-wound structure 414 by at least 5 mm.

In some implementation variants (not shown herein), the coil-former 420 is a combination of the coil-former 420 of FIG. 4B and the coil-former 420 of FIG. 4C. In an example variant, the first wire-wound structure 402 is formed, carried, and held in place by protrusive structures 422 and the second wire-wound structure 414 is formed, carried, and held in place by recessed structures 424. In another example variant, it is vice versa.

In another example variant, at least one of the wire-wound structures 402 and 414 is formed, carried, and held in place by protrusive structures 422 that are disposed along portions of the respective wire-wound structure (e.g., wire-wound structure 402).

In a further example variant, at least one of the wire-wound structures 402 and 414 is formed, carried, and held in place by recessed structures 424 that are disposed along the respective wire-wound structure (e.g., wire-wound structure 402).

In yet another example variant, at least one of the wire-wound structure 402 and 414 is formed, carried, and held in place by recessed structures 424 that are disposed along portions of the respective wire-wound structure (e.g., wire-wound structure 402) and by protrusive structures 422 disposed along other (e.g., remaining) portions of the respective wire-wound structure.

Figure 4D:
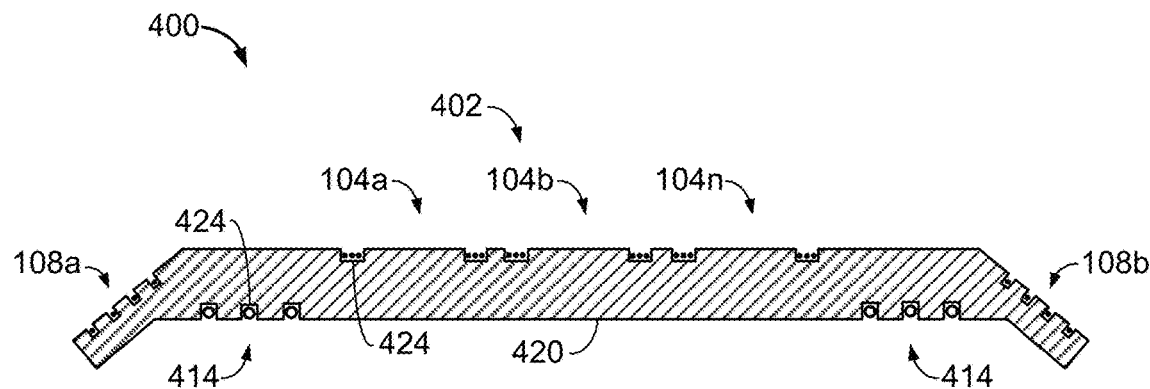
FIG. 4D is a schematic vertical cut view illustrating a further example implementation of the coil assembly of FIG. 4A including the coil-former of FIG. 4C modified with slanted edge areas.

FIG. 4D is a schematic vertical cut view illustrating another example implementation based on a modification of the coil assembly 400 as illustrated in FIG. 4C. This modification includes a substantially planar coil-former 420 providing slanted edge areas configured to form, carry, and hold in place the capacitive sense elements 108a and 108b by recessed structures 424. In some implementations, the top surface of the coil-former 420 including the slanted edge areas conform with the shape of the housing of a wireless power transfer structure (e.g., housing 328 of the wireless power transfer structure 200 illustrated in FIG. 3). For example, the slanted edge areas may be a peripheral area of the coil-former 420 having a slant angle substantially equal to the angle of the inclined portions of the housing 328 as previously discussed with reference to FIG. 3.

Figure 4E:
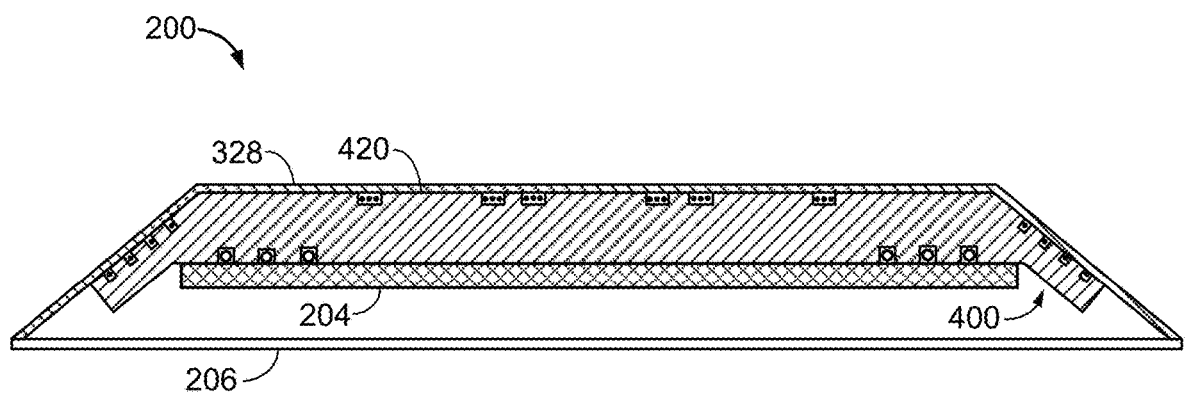
FIG. 4E is a schematic vertical cut view illustrating the ground-based wireless power transfer structure of FIG. 3 integrating the coil assembly of FIG. 4D.

FIG. 4E illustrates a schematic vertical cut view illustrating a wireless power transfer structure 200 integrating the coil assembly 400 of FIG. 4D. The coil-former 420 is shaped to conform with the inner surface of the housing 328 as discussed above with reference to FIG. 4D. The substantially planar bottom surface of the coil-former 420 may mechanically contact the ferrite structure 204 with reference to FIG. 3. In some implementations, an additional thin insulation layer (not shown in FIG. 4E) is disposed between the coil-former 420 and the ferrite structure 204, for example, to prevent partial discharge at the second wire-wound structure 414 during WPT operation.

Figure 5:
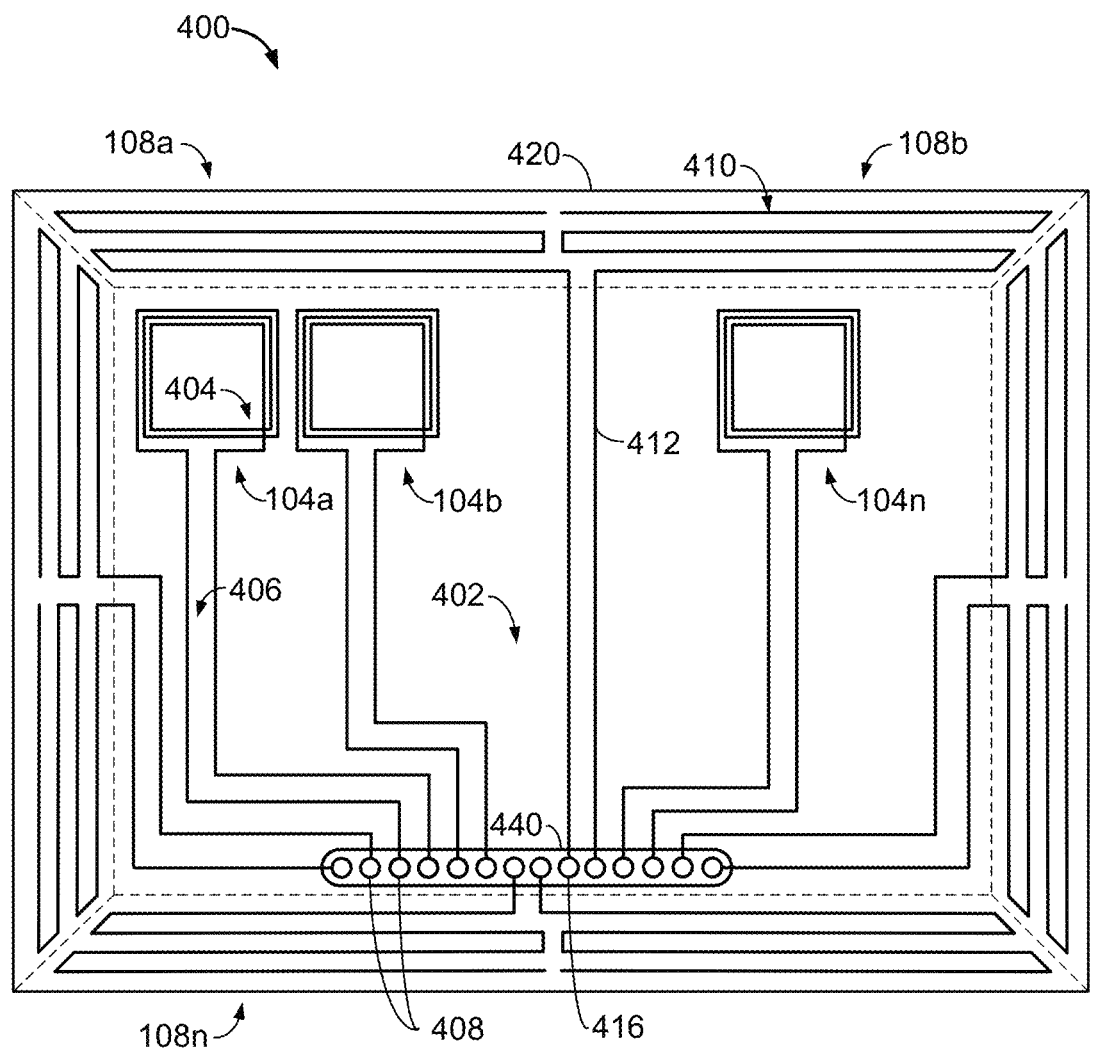
FIG. 5 is a schematic top-down view illustrating another example implementation of the coil assembly of FIG. 4A.

FIG. 5 is a schematic top-down view illustrating a further example implementation of the coil assembly 400 with reference to FIG. 4A including the coil-former 420, the first wire-wound structure 402 configured for inductive and capacitive sensing, and the second conductive structure 414 (not shown in FIG. 5 for purposes of illustration). Differently from FIG. 4A, the first wire-wound structure 402 is configured to form eight single-ended capacitive sense elements 108a, 108b, . . . , 108n. Each capacitive sense element (e.g., capacitive sense element 108a) is created by winding a piece of wire and comprises a substantially 2D wire-wound structure 410 (illustrated in FIG. 5 by a folded wire-wound structure) and a single-wire lead line 412 providing a single terminal 416 to electrically connect the capacitive sense element to a connector 440 (e.g., a multi-pin connector). The 2D wire-wound structure 410 constitutes a sense electrode configured to sense an object (e.g., living object 112) capacitively. In the example implementation of FIG. 5, the 2D wire-wound structures 410 are substantially equidistantly placed along the perimeter of the coil-former 420. Further, each inductive sense element (e.g., inductive sense element 104a) is created by winding a piece of wire and comprises a multi-turn wire loop 404 and a double-wire lead line 406 providing a pair of terminals 408 to electrically connect the inductive sense element to the connector 440. The multi-turn wire loop 404 constitutes a sense coil configured to sense an object (e.g., non-living object 110) inductively. In aspects, the wire loop 404 is a densely wound multi-turn loop maximizing the inductance of the wire loop 404. Further, the wire loop 404 may be a planar spiral coil with a spacing between windings that is substantially larger than a diameter of the piece of the wire. As indicated in FIG. 5 by dashed lines, the peripheral area of the coil-former 420 may be slanted on each of the four edges.

In an aspect of increasing a capacitance, a capacitive sense element (e.g., capacitive sense element 108a) may be created by winding of more than one wire piece, each forming a substantially 2D wire-wound structure 410 (single-ended electrode) and a corresponding single-wire lead line 412 as previously described. More specifically, the capacitive element 108a may include at least two 2D wire-wound structures 410 (e.g., single-ended electrodes) and a corresponding single-wire lead line 412 providing a terminal 416 electrically connected to the same pin of connector 440. In some implementations, each capacitive sense element (e.g., capacitive element 108a) is created from at least two substantially congruent two-dimensional wire-wound structures disposed at substantially the same location. Such a capacitive sense element may be considered as a multi-filar wire-wound structure. In another implementation, one or more neighboring (e.g., adjacent) 2D wire-wound structures 410 are connected to a common pin of connector 440 via the corresponding single-wire lead line 412 and operated in parallel (common mode). In a further implementation, pairs of 2D wire-wound structure 410 (e.g., wire-wound single-ended electrodes) are configured as double-ended electrodes to be operated in a differential mode. In yet another implementation, pairs of wire-wound single or double-ended electrodes are used to sense an object (e.g., living object 112) capacitively by measuring a 2-port electrical characteristic (e.g., a transimpedance) at the corresponding pair of terminals 416.

Figure 6:
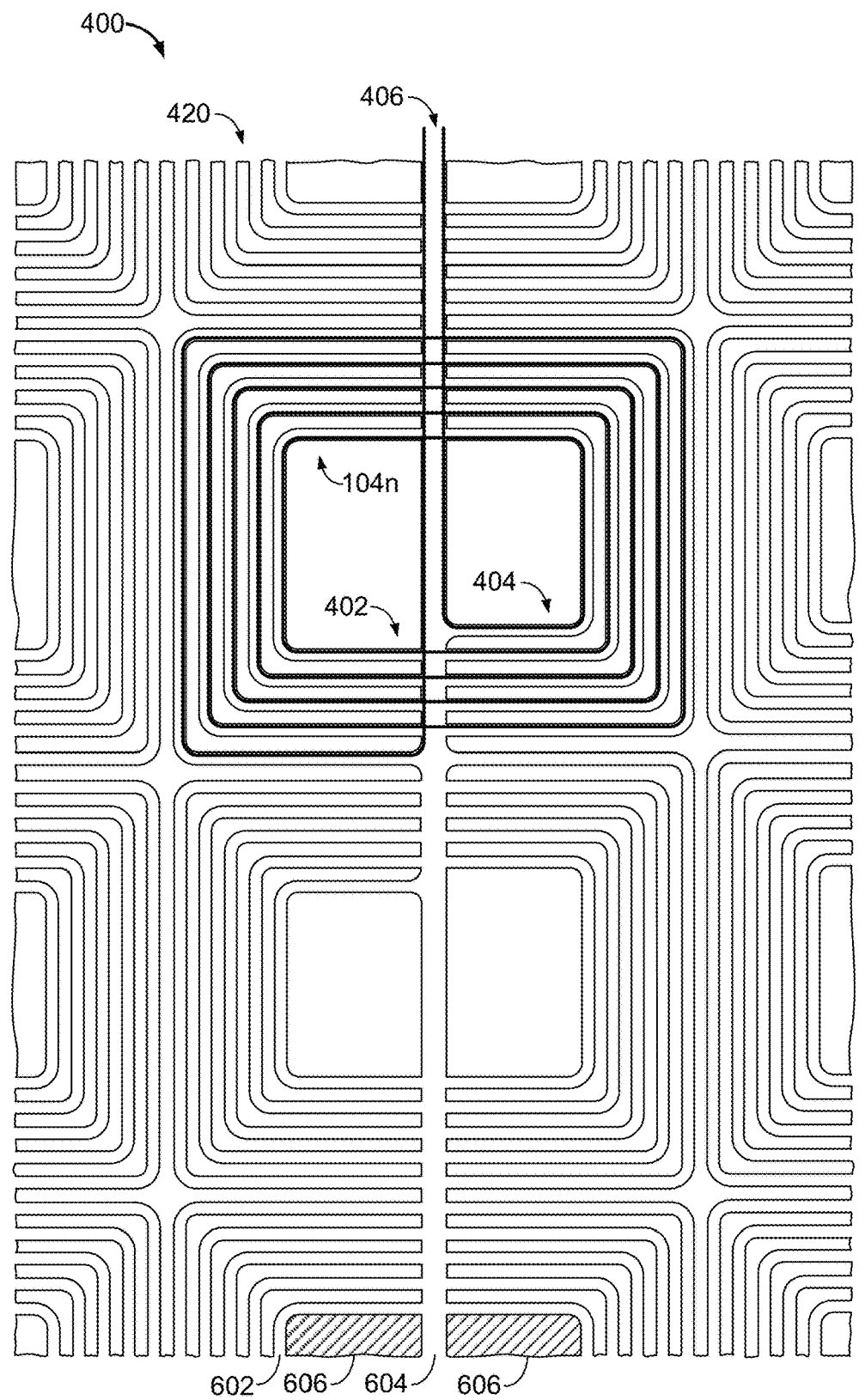
FIG. 6 is a top-down view of a detail of an example implementation of the coil-former of FIG. 4C and a portion of the first wire-wound structure of FIG. 4A configured for inductive sensing.

FIG. 6 is a top-down view illustrating an example implementation of a coil-former 420 providing recessed structures (grooves) configured to form, carry, and hold in place the first wire-wound structure 402. More precisely, FIG. 6 shows a portion (cutout) of the coil-former's 420 top surface configured to accommodate the plurality of wire-wound inductive sense elements 104. Shaded areas 606 indicate examples of non-recessed areas of the coil-former's 420 top surface. The coil-former 420 may be referred to as a recessed structured coil-former 420 with reference to FIG. 4C due to the total non-structured area (e.g., shaded area 606) exceeding the total structured (recessed) area as apparent from FIG. 6.

FIG. 6 also illustrates a portion of the first wire-wound structure 402 configured for inductive sensing. More specifically, it shows a portion of the inductive sense element 104n from FIG. 1, including a multi-turn wire loop 404 (sense coil) and a portion of the double-wire lead line 406 electrically connecting the sense coil to a connector (e.g., connector 440, not shown in FIG. 6). The spread winding of the sense coil as illustrated in FIG. 6 may reduce a variation of an object detection sensitivity over the predetermined area of the object detection system 100 with reference to FIG. 1. The object detection sensitivity may refer to an object (e.g., non-living object 110) substantially smaller than a size of the sense coil. In the example coil-former 420 shown in FIG. 6, the sense coils are regularly arranged in rows and columns and provide a substantially uniform (equidistant) spacing between windings of the same sense coil and between the outer windings of adjacent sense coils.

The recessed structures 424 (from FIG. 4D) on the coil-former's 420 top surface may include grooves 602 configured to accommodate the windings of the sense coil and grooves 604 configured to accommodate the plurality of double-wire lead lines 406 belonging to the subset of sense coils disposed in the same column of the array 106. Therefore, in some implementations, at least one of a width and a depth of the groove 604 may be larger than a respective one of a width and depth of the groove 602 as also apparent from FIG. 6.

In an aspect, a portion of the grooves has a first depth, another portion of the grooves is deeper than the first depth, and wherein the first depth is less than three millimeters.

FIG. 6 also shows rounded corners at certain locations in groove junctions (e.g., crossing of a groove 602 and a groove 604) where the wire will be bent by an angle of 90°. Rounded corners may be required in a winding process applying mechanical tension (e.g., using a wire tensioner), e.g., with respect to a minimum wire bend radius as it may be specified to prevent a wire breaking or insulation damage.

FIGS. 7A to 7K are vertical cut views illustrating various protrusive and corresponding recessed structures (profiles) 422 and 424, respectively, that may be used to form, carry, and hold in place at least one of the wire-wound structures 402 and 414. These profiles may apply to the structured areas of a coil-former's 420 surface.

Figure 7A:
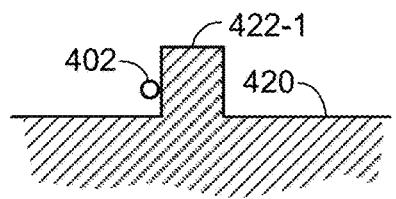
FIG. 7A is a vertical cut view illustrating a protrusive rectangular profile configured to form, carry, and hold in place the first and second wire-wound structure of FIG. 4A.
Figure 7B:
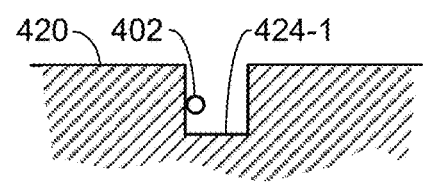
FIG. 7B is a vertical cut view illustrating a recessed rectangular profile configured to form, carry, and hold in place the first and second wire-wound structure of FIG. 4A.

FIGS. 7A and 7B illustrate a protrusive rectangular profile 422-1 (e.g., a brace, railing) and a corresponding recessed profile 424-1 (e.g., a groove) to form, carry, and hold in place the first wire-wound structure 402 by lateral forces and stiction if the wire-wound structure 402 is wound under tension (e.g., using a wire tensioner).

Figure 7C:
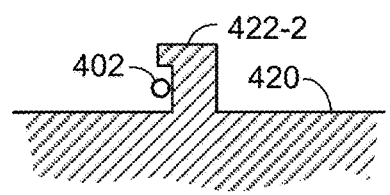
FIG. 7C is a vertical cut view illustrating a protrusive "L"-shaped coil profile configured to form, carry, and hold in place the first and second wire-wound structure of FIG. 4A.
Figure 7D:
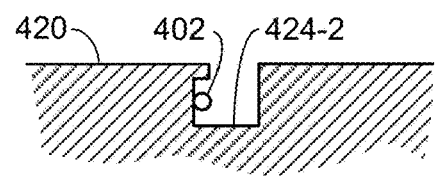
FIG. 7D is a vertical cut view illustrating a recessed "L"-shaped profile configured to form, carry, and hold in place the first and second wire-wound structure of FIG. 4A.

FIGS. 7C and 7D illustrate a protrusive "L"-shaped profile 422-2 and a corresponding recessed "L"-shaped profile 424-2 to form, carry, and hold in place the first wire-wound structure 402 if the wire-wound structure 402 is wound under tension. An "L"-shaped profile may apply to additionally secure a wire-wound structure (e.g., wire-wound structure 402) in the coil-former 420.

Figure 7E:
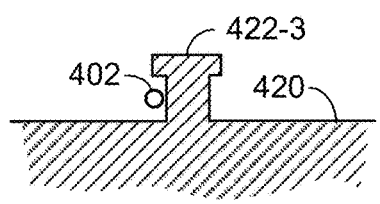
FIG. 7E is a vertical cut view illustrating a protrusive "T"-shaped profile configured to form, carry, and hold in place the first and second wire-wound structure of FIG. 4A.
Figure 7F:
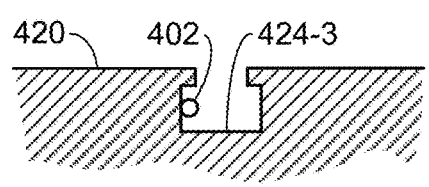
FIG. 7F is a vertical cut view illustrating a recessed "T"-shaped profile configured to form, carry, and hold in place the first and second wire-wound structure of FIG. 4A.

FIGS. 7E and 7F illustrate a protrusive "T"-shaped profile 422-3 and a corresponding recessed "T"-shaped profile 424-3, respectively. As with the "L"-shaped profile, the "T"-shaped profile may serve to additionally secure a wire-wound structure (e.g., wire-wound structure 402) in the coil-former 420.

Figure 7G:
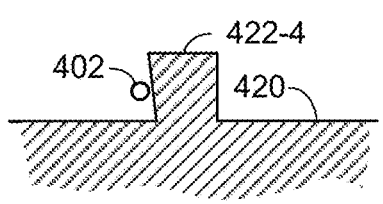
FIG. 7G is a vertical cut view illustrating a protrusive right-angled trapezoidal profile configured to form, carry, and hold in place the first and second wire-wound structure of FIG. 4A.
Figure 7H:
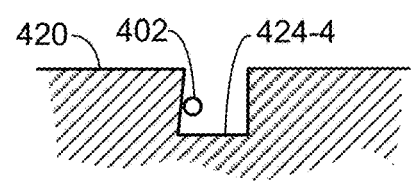
FIG. 7H is a vertical cut view illustrating a recessed right-angled trapezoidal profile configured to form, carry, and hold in place the first and second wire-wound structure of FIG. 4A.
Figure 7I:
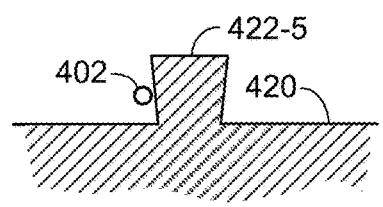
FIG. 7I is a vertical cut view illustrating a protrusive trapezoidal profile configured to form, carry, and hold in place the first and second wire-wound structure of FIG. 4A.
Figure 7J:
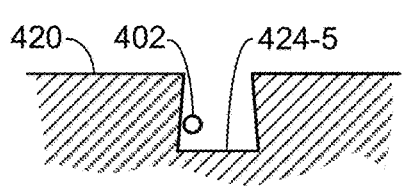
FIG. 7J is a vertical cut view illustrating a recessed trapezoidal profile configured to form, carry, and hold in place the first and second wire-wound structure of FIG. 4A.

Further profiles suitable to secure a wire-wound structure (e.g., wire-wound structure 402) in the coil-former 420 are shown in FIGS. 7G to 7J. For example, FIGS. 7G and 7H illustrate a protrusive right-angled trapezoidal-shaped profile 422-4 and a corresponding recessed right-angled trapezoidal-shaped profile 424-4, respectively. FIGS. 7I and 7J illustrate a protrusive trapezoidal-shaped (dovetail-shaped) profile 422-5 and a corresponding recessed trapezoidal-shaped (dovetail-shaped) profile 424-5, respectively.

In some implementations, different profiles apply to the top and bottom surface of the coil-former 420. In an example coil-former 420, the top surface is structured using a "T"-shaped profile (e.g., recessed "T"-shaped profile 424-3 of FIG. 7F) while the bottom surface is structured based on a rectangular profile (e.g., recessed rectangular profile 424-1 of FIG. 7B).

In other implementations, at least one of the top and bottom surfaces of the coil-former 420 is heterogeneously structured. In an example implementation, a majority of the coil-former's 420 top surface structure is rectangular shaped (e.g., recessed rectangular profile 424-1 of FIG. 7B) while an "L" or a "T"-shaped profile (e.g., recessed "T"-shaped profile 424-3 of FIG. 7F) applies only in certain areas, e.g., for purposes as mentioned above.

A rectangular-shaped profile (e.g., protrusive rectangular profile 422-1 of FIG. 7A) may be implemented more easily considering the manufacturing of a plastic coil-former (e.g., coil-former 420) using an injection molding process. It may be appreciated that overhanging profiles such as the "L"-, "T"- and trapezoidal-shaped profiles of FIGS. 7C to 7J may not allow the molded part (e.g., the coil-former 420) to be easily separated from the mold (molding tool). Therefore, in some manufacturing processes, overhanging structures are produced in a multi-step process including injection molding and one or more of a machining and thermoforming process. For example, a coil-former 420 structured with a protrusive "T"-shaped profile (e.g., profile 422-3 of FIG. 7E) may be manufactured by employing, in a first step, an injection molding process producing a coil-former 420 with an initially protrusive rectangular profile with a height larger than a target height. In a second step process employing thermoforming, the top of the protrusive rectangular profile is compressed to the target height, which will also broaden the top creating a profile similar to a "T"-shape. In some manufacturing processes, thermoforming applies directly after the coil winding (e.g., robot winding) process, e.g., to additionally secure a wire-wound structure (e.g., wire-wound structure 402). A person skilled in the art will appreciate that thermoforming is not limited to the manufacturing of "T"-shaped protrusive structures but may also apply to produce recessed overhanging profiles (e.g., a profile similar to a recessed "T"-shaped profile 424-3 of FIG. 7F).

Figure 7K:
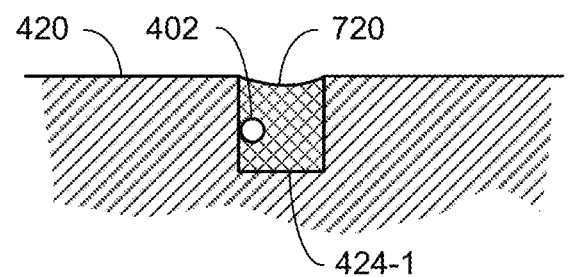
FIG. 7K is a vertical cut view illustrating the recessed rectangular profile of FIG. 7B filled with a filling material.

FIG. 7K illustrates an alternative approach to secure a wire-wound structure (e.g., wire-wound structure 402) formed, carried, and held in place by the recessed rectangular-shaped structure 424-1 (groove) of FIG. 7B. In this approach, the groove is filled with a filling compound 720, as shown in FIG. 7K directly after coil winding (e.g., robot winding). In some implementations, only portions of the grooves (e.g., grooves 602 and 604 of FIG. 6) of a coil-former 420 are filled. The filling compound 720 may include any suitable filling compound, including a plastic compound, a resin, a rubber, a gum, an adhesive, a cement, or a combination of one or more such compounds.

In other implementations based on one or more protrusive and recessed structures, the wire-wound structure (e.g., wire-wound structure 402) is secured (fixed) at specific points, e.g., using an adhesive (e.g., a fast-setting glue, cement, gum, paste, etc.). These specific points may include the non-connected (open) wire ends of the wire-wound structure 402 forming the plurality of capacitive sense elements (e.g., capacitive sense elements 108a, 108b, ..., 108n).

In further implementations, the open wire ends of the wire-wound structure 402 are secured (fixed) using a wire clamp disposed at positions as foreseen for the wire ends.

Figure 8A:
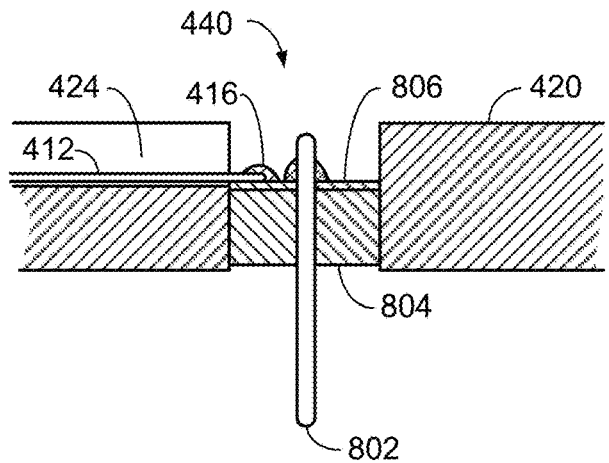
FIG. 8A is a schematic cut view of a detail illustrating an example implementation of a "pin header" connector configured for soldering of a terminal of the first wire-wound structure of FIG. 4A.
Figure 8B:
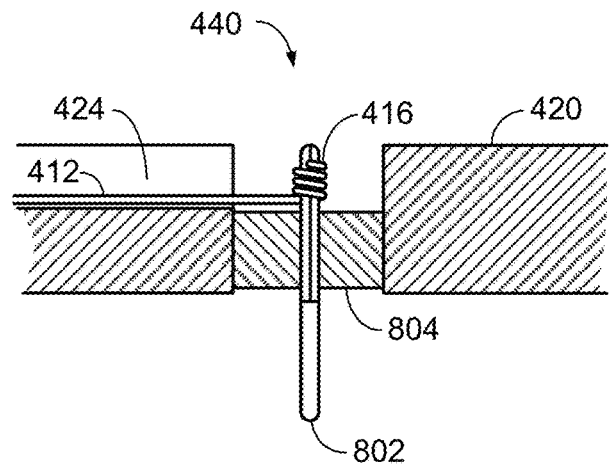
FIG. 8B is a schematic cut view of the detail of FIG. 8A, illustrating another example implementation of the "pin header" connector of FIG. 8A configured for wire wrapping of a terminal of the first wire-wound structure of FIG. 4A.
Figure 8C:
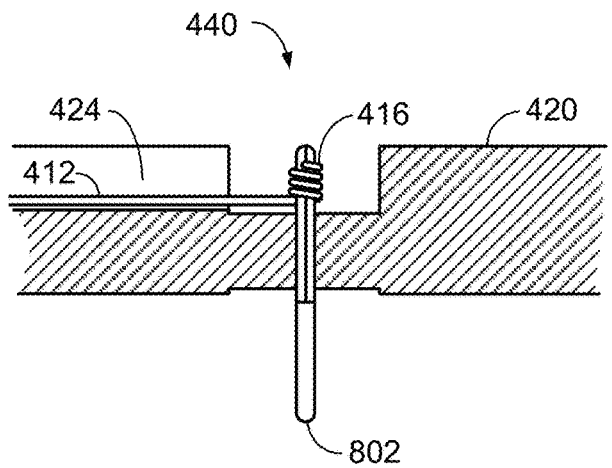
FIG. 8C is a schematic cut view of the detail of FIG. 8A, illustrating a further example implementation of the "pin header" connector of FIG. 8A as an integral part of the coil-former of FIG. 4A.

FIGS. 8A to 8C are vertical cut views illustrating example implementations of a male "pin header" connector (e.g., a multi-pin connector). More precisely, FIGS. 8A to 8C show a detail (cutout) of the coil assembly 400, including a portion of the coil-former 420, the male pin header connector 440, and a portion of the single-wire lead line 412 with reference to FIG. 4A accommodated in a recessed structure (groove) 424 configured to guide the wire to the connector 440 (e.g., groove 604 with reference to FIG. 6).

In the example implementation illustrated in FIG. 8A, the connector 440 comprises at least one connector pin 802, an electrically insulating carrier (e.g., an insert 804), and a contacting element 806 (e.g., a printed circuit board) affixed to the connector pin 802, e.g., using a solder joint as illustrated in FIG. 8A to provide a soldering pin. The contacting element 806 provides at least one soldering pad to electrically connect the wire terminal 416 with the connector pin 802. Further, the connector pin 802 is solderable, the insert is configured for a press-fit mounting with respect to both the connector pin 802 in the connector 440 and the connector 440 in the coil-former 420.

In the example implementation illustrated in FIG. 8B, the connector 440 comprises at least one connector pin 802 and an electrically insulating carrier (e.g., the insert 804). The connector pin 802 is configured for a wire wrap connection by means of cold welding to provide a wire wrap pin. In an implementation variant, the wire wrap connection is additionally soldered to provide a long-term stable electrical connection of a wire that is not particularly suitable for wire wrapping by means of cold welding. As with the implementation of FIG. 8A, the insert 804 is configured for a press-fit mounting of the connector pin 802 in the insert 804 and for a press-fit mounting of the connector 440 in the coil-former 420.

In the example implementation illustrated in FIG. 8C, the connector 440 comprises at least one connector pin 802 configured for a cold-welded or soldered wire-wrap connection. Both the connector pin 802 and the coil-former 420 are configured for a press-fit mount directly in the coil-former 420 without the need for an insert 804 with reference to FIGS. 8A and 8B. (The insert 804 may be considered merged with the coil-former 420.) In an implementation variant, the at least one connector pin 802 is inserted into the coil-former 420 as part of the injection molding process.

The various operations of methods described above may be performed by any suitable means capable of performing the corresponding functions. The means may include various hardware and/or software component(s) and/or module(s), including but not limited to a circuit, an application-specific integrated circuit (ASIC), or a processor.

As used herein, the term "determining" encompasses a wide variety of actions. For example, "determining" may include calculating, computing, processing, deriving, investigating, looking up (e.g., looking up in a table, a database, or another data structure), ascertaining, and the like. "Determining" may also include receiving (e.g., receiving information), accessing (e.g., accessing data in a memory), and the like. Further, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules, and circuits described in connection with the present disclosure may be implemented or performed with a general-purpose processor, a digital signal processor (DSP), an ASIC, a field-programmable gate array (FPGA), or other programmable logic device (PLD), discrete gate or transistor logic, discrete hardware components, or any combination thereof designed to perform the functions described herein. A processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges, depending on the specific application of the processing system and the overall design constraints. The bus may link together various circuits, including a processor, machine-readable media, and a bus interface. The bus interface may be used to connect a network adapter, among other things, to the processing system via the bus. The bus may also link various other circuits such as timing sources, peripherals, voltage regulators, power management circuits, and the like.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. An apparatus for detecting a presence of an object in a predetermined area of an inductive wireless power transfer system, the apparatus comprising: a first wire-wound structure that is electrically conductive, substantially planar, and configured for electromagnetically sensing of the object, wherein the first wire-wound structure comprises at least one piece of wire; a coil-former coupled to the first wire-wound structure, wherein the coil-former is substantially planar and has a first surface and a second surface opposite to the first surface, the coil-former configured to form a portion of the at least one piece of wire of the first wire-wound structure into a substantially two-dimensional wire-wound structure via first wire placement structures, wherein the substantially two-dimensional wire-wound structure comprises at least one single-wire lead line having a capacitance smaller than a capacitance of the substantially two-dimensional wire-wound structure, wherein the substantially two-dimensional wire-wound structure is configured to sense the object capacitively via an alternating electric field; form a second wire-wound structure via second wire placement structures, wherein the second wire-wound structure is configured to transfer power inductively; and hold in place the first wire-wound structure on the first surface and the second wire-wound structure on the second surface; and a detection circuit coupled to the first wire-wound structure and configured to: measure an electrical characteristic of the first wire-wound structure; and determine the presence of the object in response to a change in the electrical characteristic.

2. The apparatus of claim 1, wherein the first wire placement structures and the second wire placement structures comprise protrusive structures protruding from the coil-former or recessed structures recessing within the coil-former.

3. The apparatus of claim 2, wherein the at least one piece of wire is one or more of a non-insulated wire, an insulated wire, a copper wire, an aluminum wire, a copper alloy wire, an enameled wire, a magnetic wire, a solderable wire, a directly solderable enameled wire, a tin plated copper wire, a wire-wrapping wire, a Litz wire, a twisted wire, a wire bundle, a heat-sensitive electrical-resistance wire, a temperature compensated electrical resistance wire, and a heat resistant insulation wire.

4. The apparatus of claim 2, wherein:
each end of the at least one piece of wire is configured to provide a terminal to electrically couple the at least one piece of wire to the detection circuit; and
the at least one piece of wire forms a wire loop of one or more turns and a double-wire lead line having an inductance smaller than an inductance of the at least one piece of wire.

5. The apparatus of claim 4, wherein the inductance of the double-wire lead line is a short circuit inductance as measured between a first terminal and a second terminal of the at least one piece of wire.

6. The apparatus of claim 4, wherein the wire loop is configured to sense the object inductively via an alternating magnetic field.

7. The apparatus of claim 4, wherein the wire loop is a densely wound multi-turn loop maximizing an inductance of the wire loop.

8. The apparatus of claim 4, wherein the wire loop is a planar spiral coil with a spacing between windings that is substantially larger than a diameter of the at least one piece of the wire.

9. The apparatus of claim 8, wherein the planar spiral coil is configured to reduce a variation of an object detection sensitivity over the predetermined area.

10. The apparatus of claim 1, wherein:
one end of the at least one piece of wire is configured to provide a terminal to electrically couple the at least one piece of wire to the detection circuit.

11. The apparatus of claim 10, wherein the capacitance is an open-circuit capacitance of the single-wire lead line as measured between the terminal and a ground reference of the detection circuit or as measured between a terminal of a first piece of wire and a terminal of a second piece of wire.

12. The apparatus of claim 10, wherein the two-dimensional wire-wound structure includes one or more of a folded wire-wound structure, a spiral wire-wound structure, a serpentine wire-wound structure, and a meander wire-wound structure.

13. The apparatus of claim 10, wherein the two-dimensional wire-wound structure is configured to reduce a variation of an object detection sensitivity over the predetermined area.

14. The apparatus of claim 1, wherein a predetermined area for sensing the object inductively differs from a predetermined area for sensing the object capacitively.

15. The apparatus of claim 1, wherein the object includes one or more of a metallic object, a dielectric object, a ferromagnetic object, a living object, a human extremity, an animal, a vehicle underbody, a wireless power transfer structure, an inductive passive beacon, and a capacitive passive beacon.

16. The apparatus of claim 1, wherein the coil-former includes one or more of an electrically insulating material, a low electric permittivity material, a plastic material, an epoxy material, a glass-fiber-reinforced material, a ceramic material, a composite material, a carbon material, a heat-sensitive electrical conductance material, a heat-sensitive electrical impedance material, a heat-sensitive magnetic permeability material, a heat-sensitive electric permittivity material, a heat-resistant material, and a heat-conductive material.

17. The apparatus of claim 1, wherein the coil-former:
provides structures configured to form and accommodate the first and second wire-wound structures; and
is further configured for automated robot winding of the first and second wire-wound structures.

18. The apparatus of claim 17, wherein the structures provide one or more of a rectangular-shaped profile, a right-angled trapezoidal-shaped profile, a dovetail-shaped profile, an "L"-shaped profile, and a "T"-shaped profile.

19. The apparatus of claim 17, wherein:
the structures are configured as grooves;
a portion of the grooves have a first depth;
another portion of the grooves are deeper than the first depth; and
the first depth is less than three millimeters.

* * * * *